July 9, 1957  J. RZEPECKI  2,798,466
EXHAUST CONTROL FOR TWO-CYCLE INTERNAL COMBUSTION ENGINES
Filed Feb. 17, 1954

INVENTOR:
Josef Rzepecki
by Karl Michaelis
Atty.

United States Patent Office 2,798,466
Patented July 9, 1957

2,798,466

EXHAUST CONTROL FOR TWO-CYCLE INTERNAL COMBUSTION ENGINES

Josef Rzepecki, Arbon, Switzerland, assignor to Societe Anonyme Adolphe Saurer, Arbon, Switzerland, a joint-stock company of Switzerland Application February 17, 1954, Serial No. 410,891

Claims priority, application Switzerland March 6, 1953

3 Claims. (Cl. 123—65)

This invention relates to the control of the gas exhaust in two-cycle internal combustion engines.

For the purpose of increasing the charge in slot-controlled engines of this type, a controlling member such as a hinged valve, a rotary or slide valve, an oscillatory flap valve or the like has been arranged in the exhaust conduit of each cylinder, serving to shut off this conduit before the piston has overridden the slots.

Similar controlling devices have been accommodated also in the cylinder casing or in the connecting pipe inserted with plane jointing surfaces between the casing and the exhaust manifold.

The arrangement of such member inside the cylinder casing offers an advantage in so far as the cut off point is placed as near as possible to the exit slots of the cylinder, whereby the space between the cylinder and the cut off point, which forms a dead space, is kept small. This arrangement is however less satisfactory in view of the poor accessibility of the control member for servicing and cleaning purposes.

If the control member is arranged in a separate compartment mounted on plane faces of the cylinder casing the accessibility is improved, but the exhaust manifold must first be taken off and the dead space between the cylinder and the control member is greater.

According to this invention I improve the accessibility and reduce the dead space by mounting the exhaust control member inside the exhaust manifold on that side of the manifold, which adjoins the cylinder, however, with the provision that the jointing faces between the manifold and the cylinder casing are located closer to the cylinder in the middle than in the adjoining outer portions.

I prefer using as the jointing surface at the cylinder casing a part of a circular cylinder surface, for the machining of this surface of the cylinder can then be done on a boring machine and the jointing surface of the manifold can be machined on a lathe. This is the case with a manifold of more or less cylindrical cross-section.

On the other hand, if for lack of room a flat manifold has to be used, the jointing faces on the casing adjoining the manifold preferably consist of a cylindrical face nearing an ellipse.

It is possible also to provide jointing faces of V-shape or trapezoidal faces may be provided. In these latter cases machining may be done by planing or milling.

In the drawings affixed to this specification and forming part thereof four embodiments of the invention are illustrated diagrammatically by way of example.

In the drawings—

Figure 1:
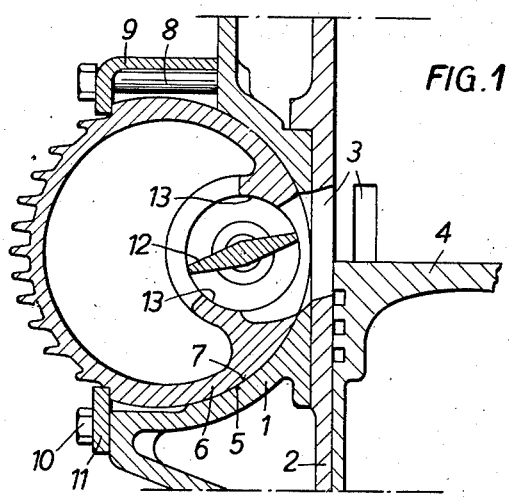
Fig. 1 illustrates an axial section of a manifold combined with the casing of a working cylinder of the engine, in which the jointing faces form part of a cylindrical face of circular cross-section.

Referring to the drawings and first to Fig. 1, 1 is part of the casing of a work cylinder of an internal combustion engine. 2 is the cylinder wall, 3 is an exhaust port or slot and 4 is an engine piston. 5 is the jointing face on the cylinder casing and 7 is the coordinated face on the manifold 6. This manifold is fixed on the casing for instance by means of a stay bolt 8 and bracket 9 on one side and by means of a screw 10 and shoulder 11 on the other side. 12 is the rotary valve or control member, 13 is its jointing face.

Figure 3:
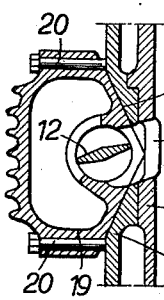
Figs. 3 and 4 show V-shaped and trapezoidal cross-sections of the jointing faces, respectively.
Figure 2:
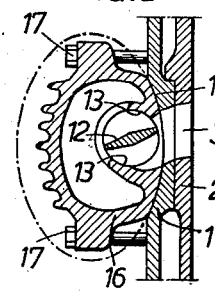
Fig. 2 is a similar view of jointing faces of ellipsoidal cross-section.

In the embodiments shown in Figs. 2 and 3, manifolds 16 and 19, respectively, are shown which have a flat non-circular cross-section. In the device illustrated in Fig. 2 the jointing face 15 at the cylinder casing which latter is pulled against the manifold 16 by means of screws 17, consists of a cylinder face nearing an elliptic cross-section.

In the embodiment of Fig. 3 the jointing face 18 at the cylinder casing 1 has the form of a V and the manifold 19 is fixed to the cylinder casing 1 by means of stay bolts 20.

Figure 4:
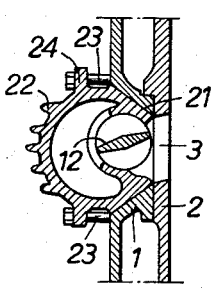

In the embodiment shown in Fig. 4 the jointing face 21 in which the manifold 22 is held by means of screws 23 has a trapezoidal shape.

Figure 5:
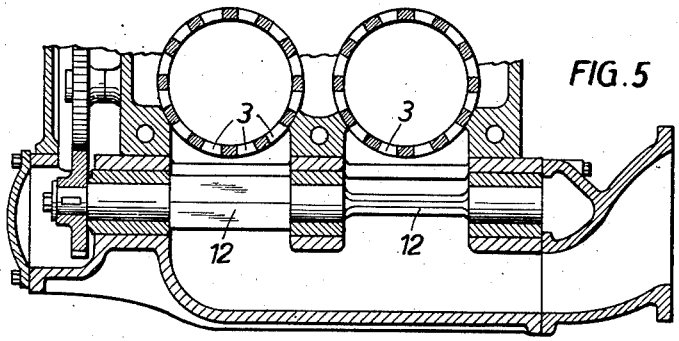
Fig. 5 is a longitudinal section of the device shown in Fig. 1, however, drawn to a reduced scale.

Fig. 5 illustrates very clearly the advantage offered by the fact that in view of the short distance existing between the control member 12 and the exhaust ports or slots of the cylinder, the dead space becomes very small.

I wish it to be understood that I do not desire to be limited to the details described in the foregoing specification and shown in the drawings, for obvious modifications will occur to a person skilled in the art.

I claim:

1. In a two-stroke cycle internal combustion engine in combination, a motor cylinder casing, the wall of this casing being provided with an exhaust port, an exhaust manifold tube, the wall of said tube being provided with an intake opening, said exhaust tube being applied against said cylinder casing with its intake opening in register with said exhaust port, a valve casing surrounding said intake opening being formed integral with said exhaust tube, a stop valve seated in said valve casing and jointing surfaces between said cylinder casing and said exhaust tube, the surface on said exhaust tube being convex, the surface on said cylinder concave.

2. The combination of claim 1, in which the seat on said exhaust tube is a section of a circular cylinder face.

3. The combination of claim 1, in which the seat on said exhaust tube is a section of an elliptical face.

References Cited in the file of this patent

UNITED STATES PATENTS

| | | |
|---|---|---|
| 1,232,849 | Russell | July 10, 1917 |
| 1,443,035 | Olson | Jan. 23, 1923 |
| 1,702,875 | Magdeburger | Feb. 19, 1929 |
| 1,887,661 | Pielstick | Nov. 15, 1932 |
| 1,890,584 | Nardin | Dec. 13, 1932 |
| 2,251,604 | Sladky | Aug. 5, 1941 |
| 2,257,631 | Wahlberg | Sept. 30, 1941 |